United States Patent [19]

Jameson

[11] Patent Number: 5,033,830
[45] Date of Patent: Jul. 23, 1991

[54] POLARIZATION INDEPENDENT OPTICAL ISOLATOR

[75] Inventor: Ralph S. Jameson, Allentown, Pa.
[73] Assignee: AT&T Bell Laboratories, Murray Hill, N.J.
[21] Appl. No.: 417,228
[22] Filed: Oct. 4, 1989
[51] Int. Cl.$^5$ .............................................. G02B 5/30
[52] U.S. Cl. ................................... 350/403; 350/377; 350/385; 350/388
[58] Field of Search ............... 350/377, 382, 384, 385, 350/388, 389, 400, 401, 403, 96.13; 455/616; 370/2

[56] References Cited

U.S. PATENT DOCUMENTS

| | | | |
|---|---|---|---|
| 3,719,414 | 3/1973 | Wentz | 350/403 |
| 4,178,073 | 12/1979 | Uchida et al. | 350/151 |
| 4,461,543 | 7/1984 | McMahon | 350/403 |
| 4,548,478 | 10/1985 | Shirasaki | 350/377 |
| 4,656,433 | 4/1987 | Franklin et al. | 330/405 |
| 4,712,880 | 12/1987 | Shirasaki | 350/377 |
| 4,770,505 | 9/1988 | Okazaki | 350/377 |

OTHER PUBLICATIONS

Grischkowsky; "Low-Loss, Double-Pass System for Laser Amplifiers", IBM Technical Disclosure Bulletin, vol. 14, No. 11, Apr. 1972, pp. 3485-3486.
"Polarization-Independent Isolators for Fiber Optics", Trans. IECE of Japan, vol. E62, No. 7, pp. 516-517, T. Matsumoto.
"Polarization-Independent Optical Circulator: An Experiment", Applied Optics, vol. 19, No. 1, Jan. 1980, pp. 108-112, T. Matsumoto et al.
"Compact Polarization-Independent Optical Circulator", Applied Optics, vol. 20, No. 15, Aug. 1981, pp. 2683-2687, M. Shirasaki et al.
"A Polarization-Independent Optical Circulator for 1.3 um", Journal of Lightwave Technology, vol. LT-1, No. 3, Sep. 1983, pp. 466-469, W. L. Emkey.
"Magneto-Optic Circulator for Optical Fiber Transmission", Journal of Appl. Physics, vol. 65, No. 4, Feb. 1989, pp. 1664-1665, X. Yan et al.
"Polarization Independent Isolators Using Spatial Walkoff Polarizers", IEEE Photonics Tech. Lett., vol. 1, No. 3, Mar. 1989, pp. 68-70, D. W. Chang et al.

Primary Examiner—Eugene R. LaRoche
Assistant Examiner—R. D. Shafer
Attorney, Agent, or Firm—Wendy W. Koba

[57] ABSTRACT

A polarization independent optical isolator is disclosed which uses a single birefringent plate. A pair of stacked reciprocal rotators, a Faraday rotator, and reflector are positioned in tandem adjacent to the birefringent plate. In the forward (transmitting) direction, a lightwave signal exiting an optical fiber is split into a pair of orthogonal rays by the birefringent plate. The orthogonal rays then pass through a first reciprocal rotator and the Faraday rotator. The rotated rays are then redirected by the reflector back through the Faraday rotator. After passing through the second reciprocal rotator, the orthogonal rays re-enter the same birefringent plate where they are recombined and launched in an output fiber. Since a Faraday rotator is a non-reciprocal device, any signal traveling through the isolator in the reverse (isolation) direction will be split on both passes through the birefringent plate such that neither will intercept the input fiber.

10 Claims, 7 Drawing Sheets

POLARIZATION INDEPENDENT OPTICAL ISOLATOR

BACKGROUND OF THE INVENTION

1. Field of the Invention

The present invention relates to a polarization independent optical isolator and, more particularly, to an optical isolator which requires only one birefringent optical device.

2. Description of the Prior Art

Optical isolators find a wide variety of applications in lightwave communication systems. In general, isolators are utilized to prevent reflected portions of a transmitted signal from re-entering the transmitting device. Many early isolator designs use a polarization-selective device to remove the unwanted reflections. In certain circumstances, where the transmission system may cause unknown, uncontrollable changes in polarization so that the polarization state of the received signal is unknown, these early devices are not considered to be of practical use. Thus, a large effort has been undertaken to develop an isolator which is polarization independent.

One prior art polarization independent optical isolator is described in the article "Polarization-Independent Isolator for Fiber Optics" by T. Matsumoto, appearing in *The Transactions of the IECE of Japan*, Vol. E62, No. 7, July 1979, pp. 516-7. In the Matsumoto isolator, the arrangement consists of a Faraday rotator and compensator (half-wave plate) inserted between a pair of birefringent crystal plates of equal thickness. As is well-known in the art, a birefringent plate functions to split an incident optical signal into a pair of orthogonal rays. Additionally, a birefringent plate functions to physically separate one ray (referred to as the "extraordinary" or "E" ray) from the other ray (referred to as the "ordinary" or "O" ray) as they travel through the plate. This phenomenon of spatial displacement is often referred to as "walkoff". In the Matsumoto isolator, a signal entering the first birefringent plate is split into orthogonal components. The rays are then rotated as they pass through the compensator and Faraday rotator. The two rays then enter the second birefringent plate (of as close a physical match to the first plate as possible) where they are recombined to form the output signal. Since a Faraday rotator is a non-reciprocal device, any signal traveling in the reverse (isolation) direction through the isolator will be physically separated into orthogonally polarized signals as it passes through both birefringent plates. One problem associated with this arrangement is that the thicknesses of the birefringent plates must be essentially identical since any difference will affect the power level of the recombined signal.

In an alternative prior art design, the compensator of the Matsumoto arrangement is replaced with an additional birefringent plate of a specific thickness. This particular design is described in the article "Polarization Independent Isolator Using Spatial Walkoff Polarizers" by K. W. Chang et al., appearing in *IEEE Photonics Technical Letters*, Vol. 1, No. 3, March 1989, at pp. 68-70. In this arrangement, the isolator consists of a first birefringent plate of thickness $\sqrt{2}$ L, a Faraday rotator, and a pair of birefringent plates of thickness L, all arranged in tandem. Since the thickness of these last two plates is only $1/\sqrt{2}$ times that of the first, the two orthogonal rays will be recombined as they travel in the forward direction. Again, since the Faraday rotator is a non-reciprocal device, the rays will be further separated in the return direction as they pass through the first birefringent plate. However, as with the Matsumoto design, the ability to accurately control the thickness of the birefringent plates is crucial to achieving low loss in the forward direction and adequate isolation in the reverse direction.

Therefore, a need remains in the prior art for a polarization independent optical isolator which is less sensitive to the physical dimensions of the optical elements.

SUMMARY OF THE INVENTION

The need remaining in the prior art is addressed by the present invention which relates to a polarization independent optical isolator and, more particularly, to an optical isolator which requires only a single birefringent plate to achieve isolation in the reverse direction.

In general, a polarization independent isolator is used with two apertures which limit the input and the output optical beam. The function of the isolator is to permit an optical beam entering through the input aperture to pass to and through the output aperture with very little attenuation. In the reverse (isolation) direction, with an optical beam entering the output aperture, the isolator deflects or diverts the beam so that it does not pass through the input aperture. In particular, the isolator of the present invention performs this function by spatially separating an incident optical beam into two components. In the forward direction, the isolator recombines these components so that they pass through the output aperture; while in the reverse direction the isolator exaggerates the separation, causing the beams to miss the input aperture. In the present invention, as with others in the prior art, the apertures may be the end faces of two optical fibers, which fibers are also used to transmit the optical beam into and away from the isolator.

An exemplary embodiment of the isolator of the present invention comprises a birefringent plate, a pair of stacked reciprocal rotators, a non-reciprocal rotator and reflection means, all arranged in tandem. In operation, a forward traveling signal enters the birefringent plate where it is split into two orthogonally polarized rays (hereinafter referred to as O- and E-rays). As the rays travel through the birefringent plate, the E-ray is spatially displaced by a predetermined amount as related to the thickness of the plate. The rays then pass through a first reciprocal rotator which performs an $\alpha°$ rotation (counterclockwise) on each ray. The rotated rays enter the non-reciprocal rotator (for example, a Faraday rotator) where they experience an additional counterclockwise rotation of $\theta°$. Subsequent to this rotation, the rays impinge on the reflecting means which redirects the rays back into the non-reciprocal rotator. The reflection causes the signals to switch their spatial locations, but maintain their same polarization as before the reflection. Since the Faraday rotator is not reciprocal in nature, both signals are rotated counterclockwise again by an additional $\theta°$. The rays then pass through the second reciprocal rotator which rotates the signals counterclockwise through an angular distance of $\beta°$, where the quantity $\alpha + 2\theta + \beta$ equals 90°. Therefore, the sum of the rotations causes the rays to be switched in polarization state as well as spatial location. The ray which is now of the "E" orientation (the original O-ray) experiences another spatial displacement as the rays pass through the birefringent plate for a second time so as to recombine with the ray of the "O" orientation. The recombined rays are then transmitted through an appropriate output aperture, e.g., they are launched into the output optical fiber. In the reverse (isolation) direction, the sum of the rotations will be $2\theta - \alpha - \beta$, or 0°, since a non-reciprocal device ($\theta$) and a pair of reciprocal devices ($\alpha$ and $\beta$) are used. The result of these rotations is that the rays will maintain their original polarization states and the same ray will experience displacement on each pass through the birefringent plate. Therefore, no recombination will occur, and the rays will miss the appropriate aperture, e.g., they will fail to enter the input optical fiber.

An advantage of the present invention, as mentioned above, is the use of a single birefringent plate. Therefore, the thickness of the birefringent plate is no longer a critical design issue. Additionally, the reduction in the number of birefringent plates allows for the isolator of the present invention to be more compact than many prior art arrangements.

The use of the reflecting means results in the isolator of the present invention being a single-ended device (i.e., input/output fibers on same side of device), which is an advantage in some situations.

Other and further advantages of the present invention will become apparent during the course of the following discussion and by reference to the accompanying drawings.

BRIEF DESCRIPTION OF THE DRAWING

FIG. 2(a-e) contains a series of ray diagrams illustrating the separation and recombination of an optical signal as it traverses the isolator of FIG. 1 in the forward (transmitting) direction;

FIG. 3(ar-hr) contains a series of ray diagrams illustrated in the separation of an optical signal as it traverses the isolator of FIG. 1 in the reverse (isolation) direction;

DETAILED DESCRIPTION

Figure 1:
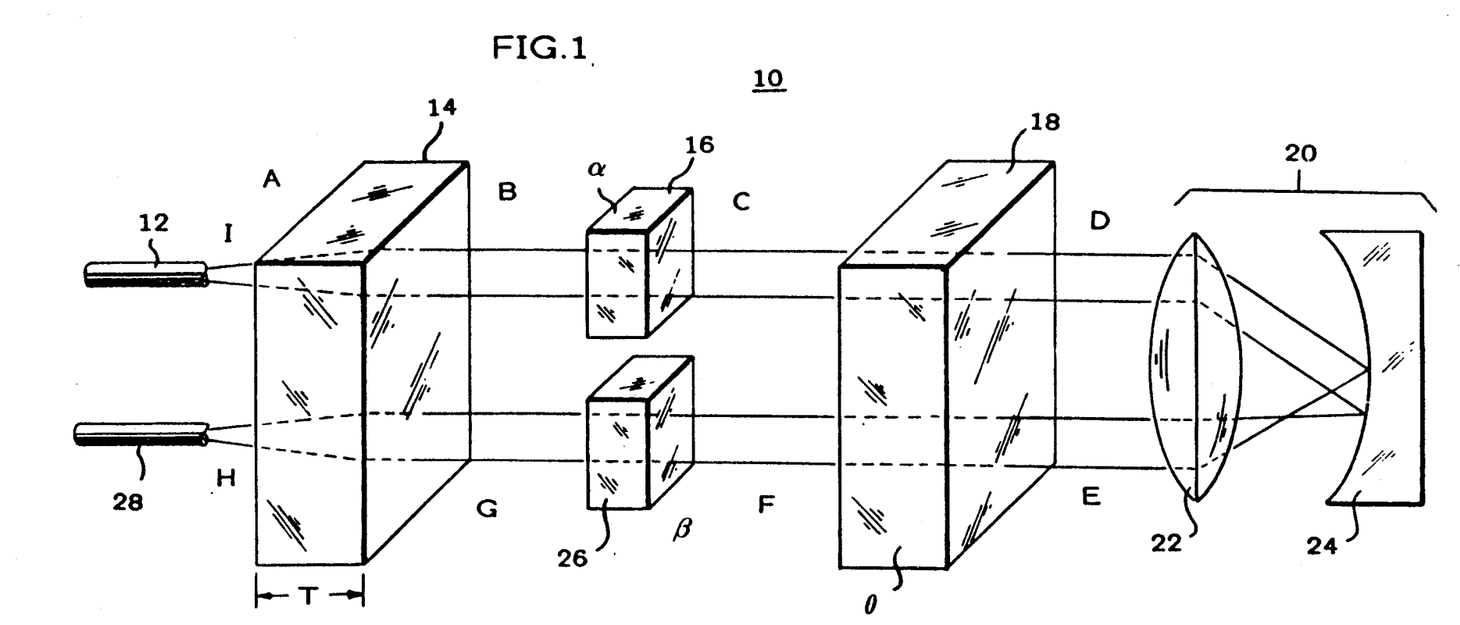
FIG. 1 illustrates a view in perspective of an exemplary optical isolator formed in accordance with the present invention.
Figure 2A:
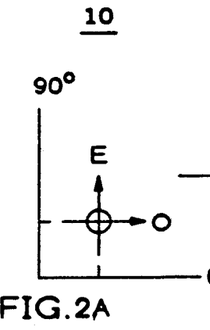
Figure 2B:
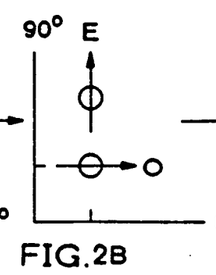
Figure 2C:
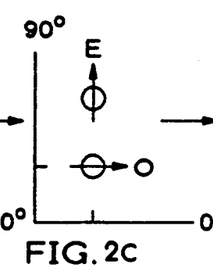
Figure 2D:
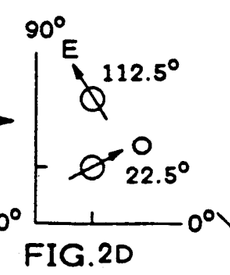
Figure 2E:
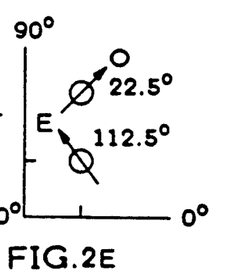
Figure 2F:
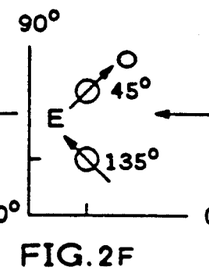
Figure 2G:
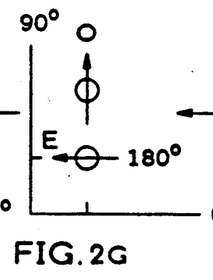
Figure 2H:
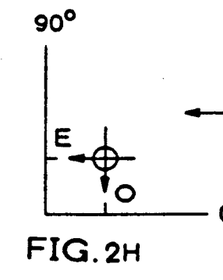

An exemplary polarization independent optical isolator 10 of the present invention is illustrated in FIG. 1. As shown, an input optical signal I exits an optical fiber 12 and enters a birefringent plate 14. Ray diagram A of FIG. 2 illustrates input signal I at the position labeled "A" in FIG. 1. Throughout the following discussion, the ray diagram denotations of FIG. 2 correspond to similarly labeled locations in isolator 10 of FIG. 1. Birefringent plate 14, as will be discussed in detail hereinafter, functions to split input signal I into orthogonal components, denoted as an O-ray and an E-ray, where the E-ray component experiences a spatial displacement as it traverses the thickness T of birefringent plate 14.

This separation is illustrated in ray diagram B of FIG. 2. The separated O- and E-rays next enter a compensating half-wave plate 16 which has its optical axis oriented at an angle of $(\alpha/2)°$ with respect to the direction of polarization of the O-ray, and and functions to rotate the direction of polarization of both rays by an angle $\alpha°$. For the sake of discussion, it will be assumed that the optical axis of half-wave plate 16 is oriented at $\alpha/2 = 0°$ so that the direction of polarization of the O- and E-rays are unaffected as they pass through plate 16, as shown in ray diagram C of FIG. 2. As seen in FIG. 1, the O- and E-rays exiting plate 16 next pass through a non-reciprocal rotator 18. For the remainder of this discussion, non-reciprocal rotator 18 will be referred to as a "Faraday rotator". In this particular embodiment, Faraday rotator 18 is designed to perform a counterclockwise rotation of $\theta = 22.5°$ on each ray. The positions of the O- and E-rays upon exiting Faraday rotator 18 are illustrated in ray diagram D of FIG. 2.

Upon exiting Faraday rotator 18, the rays will impinge reflecting means 20, which in the exemplary arrangement of isolator 10 comprises a lens 22 and concave mirror 24. As will be discussed in detail below, other arrangements for reflecting means 20 are possible. Returning to the description of isolator 10, the O- and E-rays exiting Faraday rotator 18 are reflected by mirror 24 and refocussed by lens 22 into Faraday rotator 18. As shown in ray diagram E of FIG. 2, the reflection process causes the O- and E-rays to exchange physical locations, although each maintains the same polarization as before the reflection. Since a Faraday rotator is a non-reciprocal device, the second pass through rotator 18 results in a second 22.5° counterclockwise rotation of each ray (i.e., the complete transit through Faraday rotator 18 results in a 45° counterclockwise rotation of each ray). The signals exiting Faraday rotator 18 are illustrated in ray diagram F of FIG. 2. These rays then pass through a second compensating plate 26 which has its optical axis oriented at an angle of $\beta = \alpha = 22.5°$ with respect to the direction of polarization of the original O-ray. With this orientation, each ray will experience an additional 45° counterclockwise rotation as it traverses plate 26 in this direction. Ray diagram G illustrates the O- and E-rays as they exit compensating plate 26. As seen by reference to FIG. 2, this last 45° rotation results in the rays exchanging polarization states with respect to their original orientation (illustrated in ray diagram B). Thus, on their second pass through birefringent plate 14, the E-ray (now along 180°) will be unaffected by the birefringent material. However, since the O-ray is now rotated to 90°, it will experience spatial displacement as it traverses birefringent plate 14. The displacement will be in the opposite direction (as indicated by the arrows in ray diagrams B and G) since a birefringent plate is a reciprocal device. Thus, at the output of birefringent plate 14, the O- and E-rays will be recombined to form the original signal, as shown in ray diagram H of FIG. 2. This signal is then launched into output fiber 28.

Figure 3:
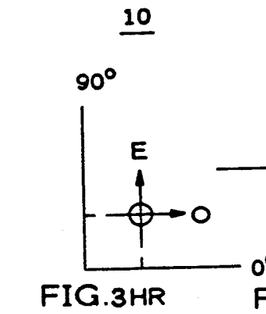

In the reverse (isolation) direction, an optical signal (typically, a spurious reflection of input signal I) exits optical fiber 28 and travels through isolator 10 in the opposite direction towards optical fiber 12. A series of ray diagrams illustrating the operation of isolator 10 on signal S is shown in FIG. 3. In particular, an optical signal S exiting optical fiber 28 is as depicted in ray diagram HR of FIG. 3 (the addition of the letter "R" to the ray diagram designations indicating the signal traveling in the "reverse" direction). On the first pass through birefringent plate 14, the E-ray will walk off in a positive direction, as shown in ray diagram GR. The split rays then pass through second compensating plate 26 which, in this direction, will rotate each ray clockwise 45°. These positions are indicated in ray diagram FR of FIG. 3. The first pass through Faraday rotator 18 next rotates each ray 22.5° counterclockwise such that the O-ray is now at −22.5° and the E-ray is at 67.5°. The rays are then refocussed and reflected by reflecting means 20 back into Faraday rotator 18. As shown in ray diagram DR of FIG. 3, the operation of reflection means 20 causes the rays to exchange physical locations (while maintaining the same polarization states) as they re-enter Faraday rotator 18. Faraday rotator 18 will rotate both the O- and E-rays an additional 22.5° in a counterclockwise direction. Thus, upon exiting Faraday rotator 18, the O-ray will be at 180° and the E-ray at 90°, as illustrated in ray diagram CR of FIG. 3. The rays then pass through first compensating plate 16. As discussed above, compensating plate 16 may be oriented such that rays at 0° and 90° pass through unaffected. Ray diagram BR illustrates this position of both rays as they exit first plate 16.

In comparing ray diagrams GR and CR of FIG. 3, it is clear that the operation of Faraday rotator 18 in this case causes the rays to be rotated back into their original polarization states. Therefore, the E-ray will again experience spatial displacement as it passes through birefringent plate 14. Traveling in this direction, the E-ray will walk off in the negative direction, as shown in ray diagram AR of FIG. 3. The displacement of the E-ray results in further separating the signal components such that neither will enter fiber 12, thus isolating devices coupled to fiber 12 from return reflections passing along fiber 28.

Figure 4:
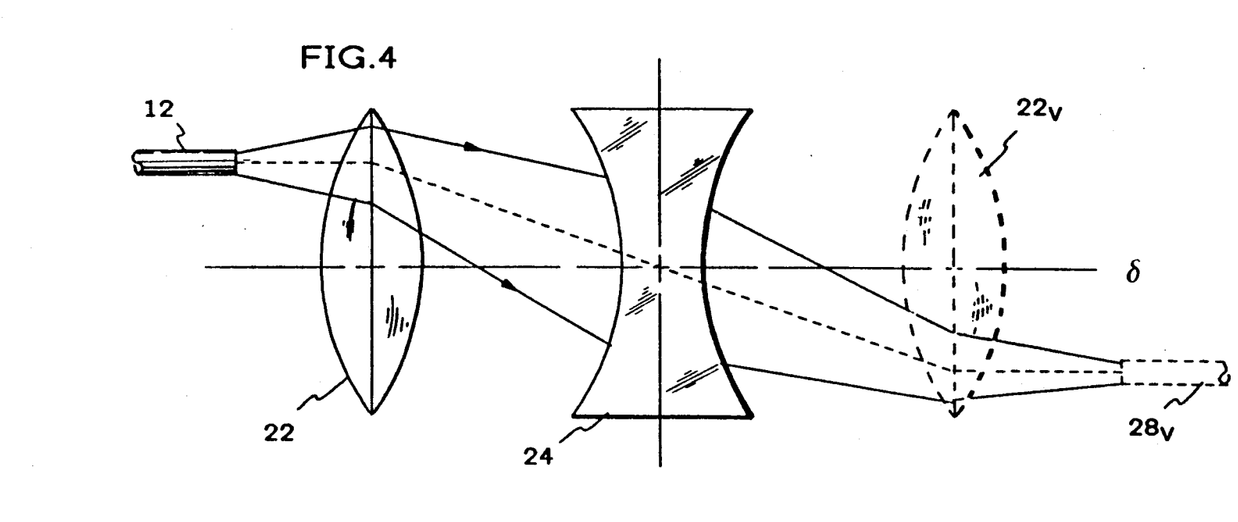
FIG. 4 illustrates an exemplary reflection means including a focusing lens for use in the isolator of the present invention.

As mentioned above, the reflection means of the inventive isolator may be formed with or without a lens. The difference in performance of these two arrangements may be seen by comparing the reflection means illustrated in FIGS. 4 and 5. FIG. 4 illustrates the operation of reflection means 20 of FIG. 1. In this case, reflection means 20 consists of a lens 22 and mirror 24. As shown in FIG. 4, the arrangement is "unfolded" along the plane of mirror 24 so that the right side of the figure is virtual space. Lens 22$_V$, shown in phantom in FIG. 4, is thus the virtual image of lens 22. The focusing system of reflection means 20 is both telecentric (so that the output beam is coaxial with the core region of output fiber 28) and has unit power (so that there is a proper match of mode size between the beam and fiber 28). These two criteria are met by placing mirror 24 at the focal point of lens 22. Correct focusing from input fiber 12 to output fiber 28 is achieved by selecting the curvature of mirror 24 to match as closely as possible the calculated curvature of the expanding beam as it passes through isolator 10.

Figure 5:
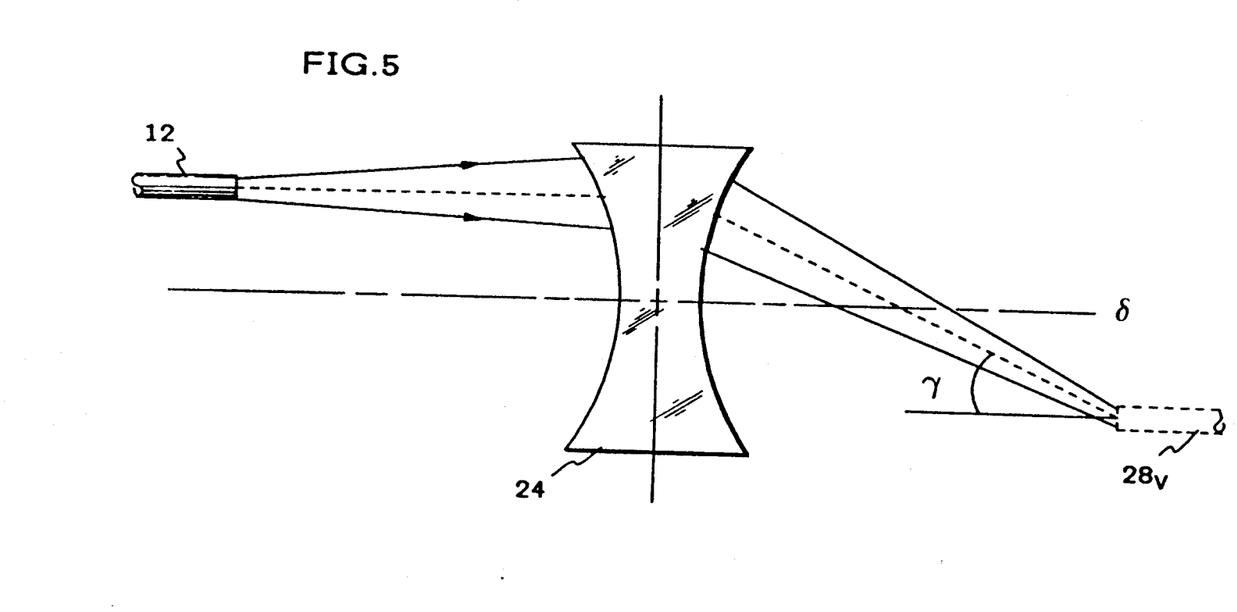
FIG. 5 illustrates an alternative lensless reflection means for use in the isolator of the present invention.

An exemplary lensless reflection means is illustrated in FIG. 5. Again, the arrangement is "unfolded" along the plane of mirror 24 so that the right side of the figure is virtual space. As shown, without a focusing lens, an angular displacement γ is created between the axis of fiber 28 and the output beam (the angle γ being exaggerated in FIG. 5 for clarity). In order to avoid significant insertion loss, the displacement angle should be kept small, on the order of approximately one degree. To achieve this small displacement, mirror 24 should be positioned relatively far from fibers 12,28, thus increasing the overall size of isolator 10. Clearly, from the standpoint of compactness, the focusing arrangement of FIG. 4 is considered to be the preferred alternative.

Figure 6:
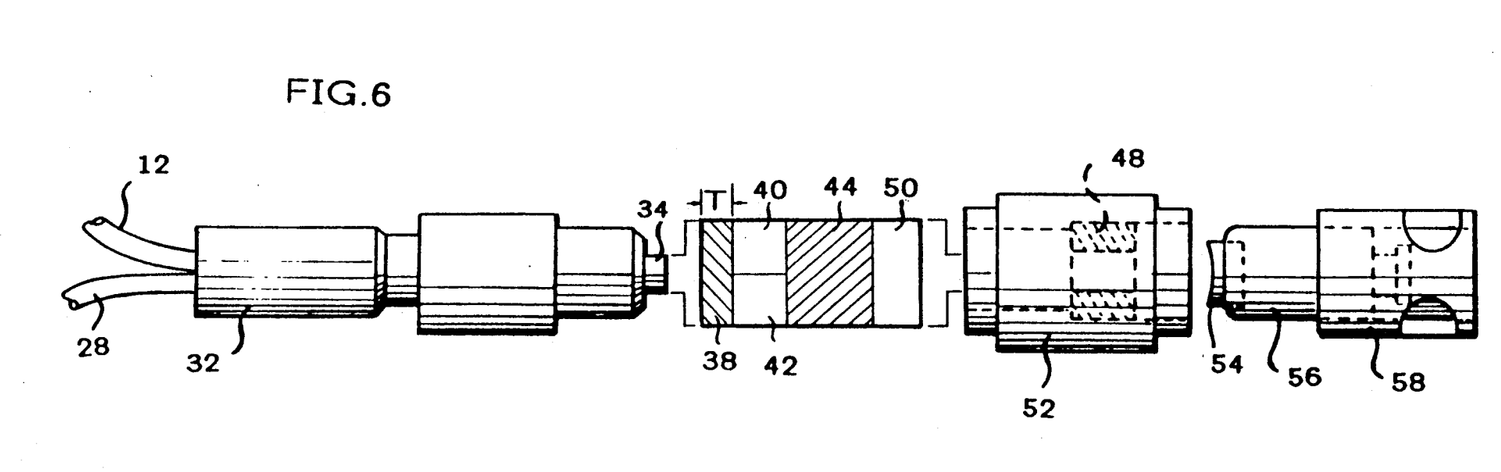
FIG. 6 illustrates an exemplary packaged isolator of the present invention.

FIG. 6 illustrates an exemplary packaged isolator 30 formed in accordance with one embodiment of the present invention. Fibers 12 and 28 are fixed within a fiber ferrule 32 such that the stripped ends of fibers 12,28 pass through the hollow body of ferrule 32 and are fixed within a capillary tube 34. The spacing between the fibers has been found to affect the insertion loss at the input to fiber 28. For single mode fibers, a separation of approximately 375 μm between fibers will provide an acceptable loss figure.

Packaged isolator 30, as shown in FIG. 6, contains an optical subassembly 36 which is formed to contain a number of the required optical components in a single housing. In particular, subassembly 36 includes a birefringent plate 38, where plate 38 may be formed of any suitable birefringent material. Calcite and rutile crystals are two such well-known birefringent materials often used in the formation of optical isolators. Each provides a displacement angle between the O- and E-rays of approximately 5.7° when cut with the optical axis at 45° to the crystal surface. Thus, a beam displacement of 20 μm (greater than two fiber core diameters-sufficient to provide isolation in the return direction) requires only a 200 μm plate thickness T. An isolator of the present invention formed with a birefringent plate of approximately 450 μm thickness has been found to provide isolation greater than −40 dB.

Returning to the description of subassembly 36, a pair of first and second compensating plates 40,42 are attached (epoxied) to birefringent plate 38 in the manner shown in FIG. 6. For proper operation of the isolator, it is critical that the pair of orthogonal rays travel through separate compensating plates on the forward and reverse paths. Therefore, the beam cannot become too divergent after exiting birefringent plate 38 before it enters first compensating plate 40. This may be accomplished by locating optical subassembly 36 in relatively close proximity to fiber ferrule 34.

Optical subassembly 36 further comprises the optical component 44 of a Faraday rotator 46 which is attached to compensating plates 40,42. The magnetic portion 48 of Faraday rotator 46 is positioned as shown in FIG. 6. Component 44 of Faraday rotator 46 may comprise an yttrium iron garnet ($Y_3Fe_5O_{12}$, YIG) crystal which is well-known in the art as having a large Faraday effect and is especially useful since it is transparent in the wavelength region from 1.1 to 6 μm at room temperature. A YIG crystal 44 requires a magnetic field of at least 1800 Gauss to ensure saturation of the Faraday rotation. A samarium-cobalt (SmCo) magnet 48 (energy density of $2.2 \times 10^7$ G-Oe) has been found to provide an adequate field for YIG saturation. As shown in FIG. 6, magnet 48 is disposed to surround optical subassembly 36. Alternatively, a bismuth-substituted thick garnet film may be used as the Faraday rotator material. A bismuth-substituted film may be preferred is some instances since a smaller thickness may achieve the same degree of rotation. As seen by reference to FIG. 6, optical subassembly 36 is completed by attaching a lens 50 to optical component 44 of Faraday rotator 46. In order to minimize package size, a small lens 50 with a short focal length is preferable. For example, a graded-index lens may be used.

In assembly, birefringent plate 38, paired compensating plates 40,42, Faraday material 44 and lens 50 are mechanically aligned and epoxied together. Both faces of material 44 and birefringent plate 38 are anti-reflection (AR) coated (for epoxy), as is the external face of lens 50 (for air). Magnet 48 is epoxied into a magnet body 52 which is fit over optical subassembly 36. A concave mirror 54 is secured by a thin film of epoxy on its flat side into a mirror ferrule 56 which mates with an outer sleeve 58. Ferrule 56 may then be axially adjusted (Z-direction) and laterally adjusted (X- and Y-direction) for performing final optical alignment.

Figure 7:
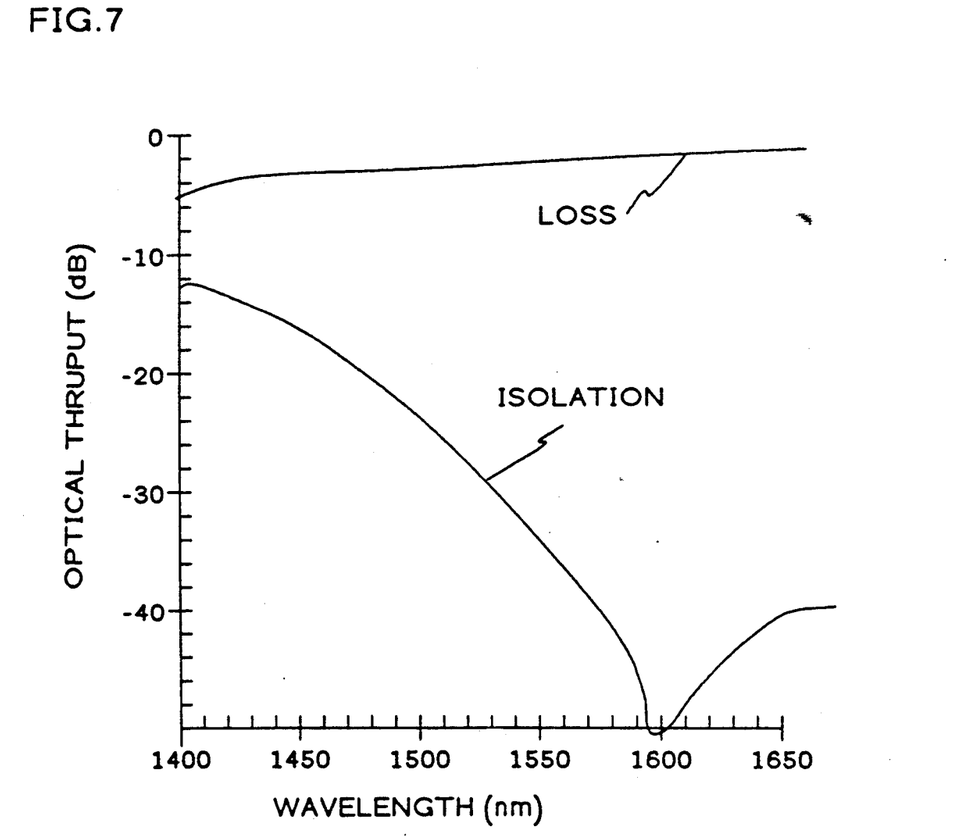
FIG. 7 is a graph indicating both signal loss (forward) and isolation (reverse) as a function of wavelength for an exemplary isolator formed in accordance with the present invention.

FIG. 7 is a graph illustrating both signal loss (in the transmitting direction) and isolation (in the return direction) as a function of wavelength for an exemplary optical isolator formed in accordance with the present invention. In this particular example, a YIG film having a 24° rotation at 1.54 $\mu$m (20° C.) was used, resulting in the isolator having a peak isolation at 1.59 $\mu$m. As shown, this peak isolation value was approximately $-41$ dB, with an average isolation of $-25$ dB in the wavelength range from 1450 to 1650 nm. The loss was less than $-2$ dB over this same range.

It is to be understood that the above-described embodiments of the present invention are exemplary only and various modifications may be made by those skilled in the art. In particular, many different focusing systems may be used, as long as the forward traveling beam is redirected into the non-reciprocal rotating element.

I claim:

1. A polarization independent optical isolator comprising
    a birefringent plate for separating an optical signal passing therethrough into first and second rays having first and second orthogonal polarizations wherein the ray of the first polarization experiences spatial displacement in a first direction as it passes through said birefringent plate in a first, transmitting direction and spatial displacement in a second, opposite direction as it passes through said birefringent plate in a second, isolation direction;
    non-reciprocal rotating means functioning to rotate said first and second rays through a predetermined angle $\theta$ in either the transmitting direction or the isolation direction;
    reflection means for redirecting first and second orthogonal rays exiting said non-reciprocal rotating means back into said non-reciprocal rotating means, wherein the reflection causes said first and second rays to exchange physical locations;
    a first reciprocal rotating means disposed between said birefringent plate and said non-reciprocal rotating means so as to intercept said first and second orthogonal rays exiting said birefringent plate in the transmitting direction and intercept said rays exiting said non-reciprocal rotation means in the isolation direction, said first reciprocal rotating means functioning to rotate said rays through a predetermined angle $\alpha$ in the transmitting direction and $-\alpha$ in the isolation direction;
    a second reciprocal rotating means disposed between said birefringent plate and said non-reciprocal rotating means so as to intercept said rays exiting said non-reciprocal rotating means in the transmitting direction and intercept said rays exiting said birefringent plate in the isolation direction, said second reciprocal rotating means functioning to rotate said rays through a predetermined angle $\alpha$ in the transmitting direction and $-\beta$ in the isolation direction, wherein the sum $\alpha + 2\theta + \beta$ approximately equals 90° in the transmitting direction such that said first and second rays exchange polarization states upon traveling through said isolator in the transmitting direction, and in the isolation direction the sum $2\theta - \alpha - \beta$ approximately equals 0° such that the first and second rays maintain polarization states upon traveling through said isolator in the isolation direction.

2. A polarization independent optical isolator as defined in claim 1 wherein the non-reciprocal rotating means comprises a Faraday rotator.

3. A polarization independent optical isolator as defined in claim 2 wherein the Faraday rotator includes a yttrium-iron-garnet film and a samarium-cobalt magnet surrounding said film.

4. A polarization independent optical isolator as defined in claim 2 wherein the Faraday rotator includes a bismuth-substituted garnet film and samarium-cobalt magnet surrounding said film.

5. A polarization independent optical isolator as defined in claim 2 wherein the Faraday rotator functions to rotate each ray through a predetermined angular displacement $\theta$ of approximately 22.5°.

6. A polarization independent optical isolator as defined in claim 1 wherein the first and second reciprocal rotating means comprise first and second compensating plates, with the optical axis of said first compensating plate oriented at an angle of approximately 22.5° with respect to the second compensating plate.

7. A polarization independent optical isolator as defined in claim 6 wherein the first and second compensating plates comprise quartz halfwave plates.

8. A polarization independent optical isolator as defined in claim 1 wherein the reflection means comprises a concave mirror with a curvature substantially matched to the curvature of an expanded beam formed by the first and second orthogonal rays.

9. A polarization independent optical isolator as defined in claim 8 wherein the reflection means further comprises a focusing lens disposed between the non-reciprocal rotating means and the concave mirror, wherein said concave mirror is positioned at the focal point of said lens.

10. A polarization independent optical isolator as defined in claim 9 wherein the lens comprises a graded-index lens.

* * * * *